United States Patent
Ohsawa et al.

(10) Patent No.: US 10,989,629 B2
(45) Date of Patent: Apr. 27, 2021

(54) METHOD OF EVALUATING TIRE GROUND CONTACT PROPERTY

(71) Applicant: BRIDGESTONE CORPORATION, Tokyo (JP)

(72) Inventors: Yasuo Ohsawa, Tokyo (JP); Shimpei Maeda, Tokyo (JP); Akira Kobayakawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 102 days.

(21) Appl. No.: 16/522,782

(22) Filed: Jul. 26, 2019

(65) Prior Publication Data
US 2019/0346342 A1 Nov. 14, 2019

Related U.S. Application Data

(63) Continuation of application No. PCT/JP2018/001829, filed on Jan. 22, 2018.

(30) Foreign Application Priority Data

Jan. 27, 2017 (JP) .............................. JP2017-013670
Jan. 27, 2017 (JP) .............................. JP2017-013675

(51) Int. Cl.
*G01M 17/02* (2006.01)

(52) U.S. Cl.
CPC ................................. *G01M 17/027* (2013.01)

(58) Field of Classification Search
CPC ...... G01M 17/02; G01M 17/027; G01M 3/00; G01M 3/002; G01M 3/16;
(Continued)

(56) References Cited

U.S. PATENT DOCUMENTS

2008/0116374 A1   5/2008  Ouchi et al.
2011/0046768 A1*  2/2011  Rayzak ................. H01B 3/441
                                                    700/103
(Continued)

FOREIGN PATENT DOCUMENTS

CN   101196438 A   6/2008
CN   102053042 A   5/2011
(Continued)

OTHER PUBLICATIONS

Communication dated Sep. 29, 2020, from the European Patent Office in application No. 18744442.7.
(Continued)

*Primary Examiner* — Michael P Stafira
(74) *Attorney, Agent, or Firm* — Sughrue Mion, PLLC

(57) ABSTRACT

A method, of the present disclosure, of evaluating a tire ground contact property includes mounting a tire on one surface of a flat plate; placing a predetermined load on the tire or placing the tire in a no-load state; irradiating the tire with terahertz waves having a frequency of 0.1 THz to 10 THz from the other surface side of the flat plate or from inside the flat plate, the wavelength of the terahertz waves being greater than the roughness average length in at least a portion of the one surface of the flat plate and/or greater than the roughness average height in at least a portion of the one surface of the flat plate; detecting reflected terahertz waves from the tire; and evaluating the ground contact property of the tire on the basis of the detection result.

20 Claims, 3 Drawing Sheets

(58) Field of Classification Search
CPC ....... G01N 2021/1742; G01N 21/3581; G01N 21/55; G01N 21/59; G01N 21/95; G01N 21/3563; G01N 21/3586; G01N 21/3577; G01N 21/8806; G01N 2201/06113; G01N 21/21; G01N 21/552; G01N 21/01; G01N 21/85; G01N 21/8901; G01N 2201/0636; G01N 2201/0683; G01N 1/28; G01N 2021/845; G01N 21/255; G01N 21/4795; G01N 2201/0638; G01N 2201/105; G01N 33/32; G01N 17/006; G01N 1/2813; G01N 2021/3155; G01N 2021/3595; G01N 2021/396; G01N 2021/4797; G01N 2021/558; G01N 2021/8627; G01N 2021/8645; G01N 2021/8663; G01N 2021/95676; G01N 21/05; G01N 21/17; G01N 21/23; G01N 21/35; G01N 21/3554; G01N 21/39; G01N 21/49; G01N 21/86; G01N 21/89; G01N 21/892; G01N 21/952; G01N 2201/061; G01N 2201/064; G01N 2201/069; G01N 2201/0697; G01N 2201/10; G01N 2201/101; G01N 2201/104; G01N 2201/129; G01N 22/00; G01N 22/04; G01N 23/041; G01N 23/046; G01N 23/083; G01N 24/10; G01N 24/12; G01N 25/72; G01N 27/04; G01N 33/02; G01N 33/346; G01N 9/24; G01N 9/36; G01B 11/06; G01B 11/0633; G01B 11/0625; G01B 11/24; G01B 15/02; G01B 11/00; G01B 11/02; G01B 11/026; G01B 11/0616; G01B 11/0658; G01B 11/0666; G01B 11/0691; G01B 11/08; G01B 11/2408; G01B 11/2518; G01B 11/27; G01B 21/047; G01B 2210/42; G01B 5/0014; G01B 7/14; G01B 9/02018; G01B 9/02024; G01B 9/02025; G01B 9/02091; G01J 3/42; G01J 2003/425; G01J 3/0208; G01J 3/2823; G01J 2005/0077; G01J 3/06; G01J 3/10; G01J 3/4535; G01J 1/02; G01J 1/08; G01J 1/4228; G01J 1/44; G01J 2001/446; G01J 2003/421; G01J 3/021; G01J 3/0213; G01J 3/0224; G01J 3/027; G01J 3/28; G01J 3/2803; G01J 3/433; G01J 4/04; G01J 5/02; G01J 5/0225; G01J 5/023; G01J 5/0853; G01J 5/0896; G01J 5/10; G01J 5/12; G01J 5/20; G01J 5/34; G02B 5/00; G02B 5/001; G02B 27/0927; G02B 27/095; G02B 13/0005; G02B 26/105; G02B 26/12; G02B 17/04; G02B 1/002; G02B 1/007; G02B 1/111; G02B 21/0032; G02B 21/0088; G02B 21/367; G02B 26/10; G02B 26/101; G02B 26/123; G02B 26/124; G02B 26/125; G02B 27/1066; G02B 27/14; G02B 27/283; G02B 27/58; G02B 3/04; G02B 5/0205; G02B 5/04; G02B 5/3058; G02B 5/3066; G02B 5/3083; G02B 6/105; G02B 6/1226; G02B 6/1228; G02B 6/42

See application file for complete search history.

(56) References Cited

U.S. PATENT DOCUMENTS

| | | | |
|---|---|---|---|
| 2015/0268132 | A1 | 9/2015 | Luther et al. |
| 2016/0047753 | A1* | 2/2016 | Huber .................. G01N 21/55 250/341.8 |

FOREIGN PATENT DOCUMENTS

| | | |
|---|---|---|
| CN | 103792520 A | 5/2014 |
| CN | 104662390 A | 5/2015 |
| CN | 105209879 A | 12/2015 |
| CN | 105675131 A | 6/2016 |
| DE | 102012208177 A1 | 11/2013 |
| EP | 2 988 108 A1 | 2/2016 |
| EP | 2985585 A1 | 2/2016 |
| JP | 3406643 B | 5/2003 |
| JP | 2003-163203 A | 6/2003 |
| JP | 2007-230328 A | 9/2007 |
| JP | 2008-116439 A | 5/2008 |
| JP | 2010261902 A | 11/2010 |
| JP | 2016-041577 A | 3/2016 |
| JP | 2018119928 A | 8/2018 |
| JP | 2018119931 A | 8/2018 |

OTHER PUBLICATIONS

International Search Report for PCT/JP2018/001829 dated Apr. 3, 2018 [PCT/ISA/210].

International Preliminary Report on Patentability with a Translation of Written Opinion in International Application No. PCT/JP2018/001829, dated Jul. 30, 2019.

Zhou, "Prediction of wear life of engineering tire", The world rubber industry, Dec. 31, 2004, pp. 36-40, p. 46 (6 pages total).

Search Report dated Jul. 31, 2020, from the China National Intellectual Property Administration in Application No. 201880008343.9.

Search Report dated Feb. 10, 2021, from the China Intellectual Property Administration in application No. 201880008343.9.

* cited by examiner

METHOD OF EVALUATING TIRE GROUND CONTACT PROPERTY

TECHNICAL FIELD

The present disclosure relates to a method of evaluating a tire ground contact property.

BACKGROUND

In a known method of evaluating the ground contact property of a tire, the tire is mounted on a flat plate that is transparent with respect to visible light, and a predetermined load is applied. In this state, the tire is irradiated with visible light from below the flat plate, and the reflected light is detected. For example, see patent literature (PTL) 1.

CITATION LIST

Patent Literature

PTL 1: JP3406643B2

SUMMARY

Technical Problem

The actual road surfaces on which vehicles are driven are paved with asphalt or concrete or are unpaved rocky, sandy, or dirt roads. Hence, demand exists for evaluating the ground contact property of a tire on a road surface having predetermined unevenness. When using an uneven flat plate with the aforementioned method, however, visible light may be scattered by the unevenness, making it difficult to evaluate the ground contact property of a tire on the uneven flat plate.

In light of these considerations, it is an objective of the present disclosure to provide a method of evaluating a tire ground contact property that allows the ground contact property of a tire to be evaluated on a flat plate, even when the flat plate has a predetermined unevenness.

Solution to Problem

A summary of the present disclosure is as follows.

A method, according to the present disclosure, of evaluating a tire ground contact property includes mounting a tire on one surface of a flat plate;

placing a predetermined load on the tire or placing the tire in a no-load state; irradiating the tire with a terahertz wave having a frequency of 0.1 THz to 10 THz from another surface side of the flat plate or from inside the flat plate, a wavelength of the terahertz wave being greater than a roughness average length in at least a portion of the one surface of the flat plate and/or greater than a roughness average height in at least a portion of the one surface of the flat plate; detecting a reflected terahertz wave from the tire; and evaluating a ground contact property of the tire on the basis of a detection result.

Advantageous Effect

The present disclosure can provide a method of evaluating a tire ground contact property that allows the ground contact property of a tire to be evaluated on a flat plate, even when the flat plate has a predetermined unevenness.

DETAILED DESCRIPTION

Embodiments of the present disclosure are described below in detail with reference to the drawings.

<First Aspect>

Figure 1:
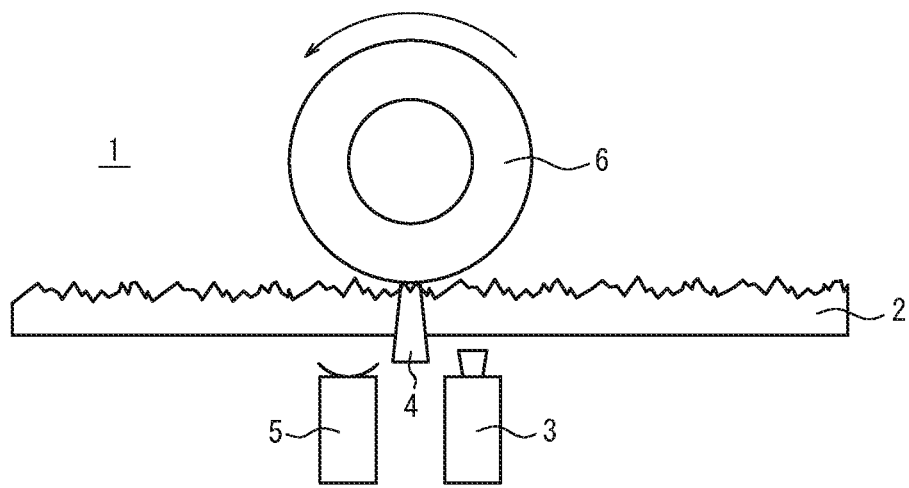
FIG. 1 schematically illustrates an apparatus for evaluating a tire ground contact property used in a method, according to an embodiment of a first aspect and a second aspect of the present disclosure, of evaluating a tire ground contact property on a flat plate having an example of predetermined unevenness.

FIG. 1 schematically illustrates an apparatus for evaluating a tire ground contact property used in a method, according to an embodiment of a first aspect of the present disclosure, of evaluating the ground contact property of a tire on a flat plate having an example of predetermined unevenness. As illustrated in FIG. 1, this apparatus 1 for evaluating a tire ground contact property includes a flat plate 2, an irradiation apparatus 3 for irradiating terahertz waves, a force sensor 4, and a reflected wave detection apparatus 5.

In the present embodiment, the flat plate 2 is an acrylic plate that is transparent with respect to visible light. In this example, the flat plate 2 has an unevenness modeling an actual road surface formed on one entire surface (the upper surface in FIG. 1). The entire other surface (the lower surface in FIG. 1) of the flat plate 2 is formed to be flat. A minute unevenness is actually formed, however, since unevenness cannot be completely eliminated by engineering. Specifically, on one surface (the upper surface in FIG. 1) in this example, the average length RSm of a roughness curve element with a reference length of 0.8 mm is 0.13 mm to 0.4 mm, and the average length RSm of a roughness curve element with a reference length of 0.25 mm is 0.04 mm to 0.13 mm, as defined in JIS B0601. On the other surface (the lower surface in FIG. 1), the average length RSm of a roughness curve element having a standard length of 0.08 mm is 13 µm to 40 µm, as defined in JIS B0601.

In the example illustrated in FIG. 1, the irradiation apparatus 3 is disposed at the lower side (the other surface side) of the flat plate 2 in a manner allowing irradiation of terahertz waves from the other surface (the lower surface in FIG. 1) towards the one surface (the upper surface in FIG. 1) of the flat plate 2. Any known apparatus capable of irradiating terahertz waves having a frequency of 0.1 THz to 10 THz may be used as the irradiation apparatus 3.

In this example, the force sensor 4 can measure pressure or shear stress t when a tire 6 is mounted on one surface (the upper surface in FIG. 1) of the flat plate 2, a predetermined load is applied, and the tire 6 is rotated relative to the flat plate 2 on the flat plate 2. In this case, any known pressure sensor or shear stress sensor, or a pressure/shear stress sensor that can measure pressure and shear stress, can be used as the force sensor 4. In this example, the force sensor 4 is configured so that a portion is embedded inside the flat plate 2. In the present embodiment, an apparatus that measures other characteristics may be provided instead of the force sensor 4, or a configuration without the force sensor 4 or the like may be adopted.

The reflected wave detection apparatus 5 detects reflected terahertz waves reflected by the tire 6. Any appropriate known apparatus may be used as the reflected wave detection apparatus 5. In this example, the irradiation apparatus 3 is disposed at the lower side of the flat plate 2, and the tire 6 is disposed on one surface (the upper surface in FIG. 1) of the flat plate 2. Therefore, the reflected wave detection apparatus 5 is disposed at the lower side of the flat plate 2 to be capable of detecting the reflected terahertz wave. The reflected wave detection apparatus 5 is not, however, limited to this example and may be disposed in any way allowing detection of the reflected terahertz wave from the tire 6.

In the method of the present embodiment, the tire 6 is first mounted on one surface (the upper surface in FIG. 1) of the flat plate 2, and a predetermined load is applied to the tire 6, as illustrated in FIG. 1. The tire 6 is mounted on a rim in this example. The rim refers to a standard rim of an applicable size, such as the Measuring Rim in the STANDARDS MANUAL of the European Tyre and Rim Technological Organisation (ETRTO) in Europe or the Design Rim in the YEAR BOOK of the Tire and Rim Association, Inc. (TRA) in the USA, that is described, or will be described in the future, in industrial standards effective in the region where the tire is manufactured and used, such as the YEAR BOOK published by the Japan Automobile Tyre Manufacturers Association (JATMA) in Japan, the STANDARDS MANUAL of the ETRTO, and the YEAR BOOK of the TRA (in other words, the "rim" encompasses not only current sizes but also sizes that may be included in industrial standards in the future. An example of the "size that will be described in the future" is the size described under "future developments" in the ETRTO Standards Manual 2013). In the case of a size not specified in the aforementioned industrial standards, the "rim" refers to a rim whose width corresponds to the bead width of the tire. In this example, the tire 6 mounted on the rim is filled to an internal pressure. The internal pressure may, for example, be the air pressure (maximum air pressure) corresponding to the tire maximum load capability, in the standards by JATMA or the like, in a tire of applicable size mounted on the aforementioned applicable rim. In the case of a size not listed in the industrial standards, the internal pressure refers to the air pressure (maximum air pressure) corresponding to the maximum load capability prescribed for each vehicle on which the tire is mounted. Furthermore, an example of the "predetermined load" is the tire maximum load capability in standards by JATMA or the like. Alternatively, the predetermined load may be set freely in accordance with the goal of the ground contact property evaluation, for example to 0.8 or 0.9 times the tire maximum load capability. In the present embodiment, a predetermined load is placed on the tire 6. When evaluating the contact state under no load for comparison, however, the tire 6 may be in a no-load state. The air may be replaced by an inert gas, such as nitrogen gas, or another gas.

Next, the tire 6 is rotated relative to the flat plate 2 on the flat plate 2. While rotation of the tire 6 is not illustrated, the tire 6 may be rotated using any known apparatus capable of rotating the tire 6 about an axis. To rotate the tire 6 relatively on the flat plate 2, the tire 6 may be kept in the same position in a manner allowing rotation about an axis, and the flat plate 2 may be moved. Alternatively, the flat plate 2 may be kept motionless, and the tire 6 may be rolled on the motionless flat plate 2. Furthermore, both the flat plate 2 and the tire 6 may be moved for the tire 6 to rotate relatively on the flat plate 2. In either case, the irradiation apparatus 3 and the reflected wave detection apparatus 5 may be kept motionless or moved. In these cases, while not illustrated, any known apparatus capable of moving the flat plate 2, the irradiation apparatus 3, the reflected wave detection apparatus 5, and the tire 6 may be used.

The irradiation apparatus 3 is positioned by the other surface (the lower surface in FIG. 1) of the flat plate 2 and irradiates terahertz waves, having a frequency of 0.1 THz to 10 THz, towards the tire 6 located on the one surface (the upper surface in FIG. 1) of the flat plate 2. In this example, the irradiation apparatus 3 is disposed at the lower side of the flat plate 2 (by the other side), but this example is not limiting. The irradiation apparatus 3 may also be disposed inside the flat plate 2, for example, to be capable of irradiating terahertz waves from inside the flat plate 2 towards the one surface (the upper surface in FIG. 1) of the flat plate 2.

In the present embodiment, the wavelength of the irradiated terahertz waves (0.03 mm to 3 mm for terahertz waves with a frequency of 0.1 THz to 10 THz) is greater than the average length RSm of a roughness curve element with a reference length of 0.8 mm or the average length RSm of a roughness curve element with a reference length of 0.25 mm, as defined in JIS B0601, in at least a portion of one surface of the flat plate 2. Consequently, the irradiated terahertz waves are irradiated onto the tire 6 on the flat plate 2 without being scattered by the flat plate 2. Since the wavelength of the terahertz waves is greater than the aforementioned RSm of an uneven lower surface 4b, the terahertz waves reflected by the tire 6 can also travel below the flat plate 2 without being scattered by the flat plate 2.

Next, the terahertz waves reflected by the tire 6 are detected by the reflected wave detection apparatus 5. The ground contact property of the tire 6 is evaluated on the basis of the detection result. For example, the reflected terahertz waves can be converted to an image by the reflected wave detection apparatus 5, and the ground contact property of the tire 6 can be evaluated using the image.

In this way, the method of the present embodiment can evaluate the tire ground contact property of a tire on the flat plate 2, even when the flat plate 2 has a predetermined unevenness. For example, if the shear stress t in the contact patch is measured with the force sensor 4, then the wear energy can be calculated as follows in the present embodiment. Specifically, a wear rate W of the tread of the tire can be expressed as W=A×E, using a mechanical wear energy E and a constant of proportionality A representing the ease of wear of the rubber. Here, E can be expressed by Equation 1 below.

$$E = \int (\tau_x dS_x + \tau_y dS_y) \qquad \text{Equation 1}$$

(S is a slip amount, τ is shear stress, and the subscripts x and y represent the x-direction and y-direction in the x-y plane)

Here, $\tau_x$ and $\tau_y$ can be measured with the force sensor 4. The slip amount S can be derived on the basis of the result of detecting the reflected terahertz waves. Accordingly, the wear energy of the tire can be calculated, using the shear stress τ measured by the force sensor 4 and the derived slip amount S, to determine the tread wear rate W of the tire in the present embodiment. While the "average length RSm of a roughness curve element with a reference length of 0.8 mm or the average length RSm of a roughness curve element with a reference length of 0.25 mm" are used as the roughness average length in the present embodiment, a different reference length may be used in the present embodiment as long as the terahertz waves are not scattered by the unevenness.

Figure 2:
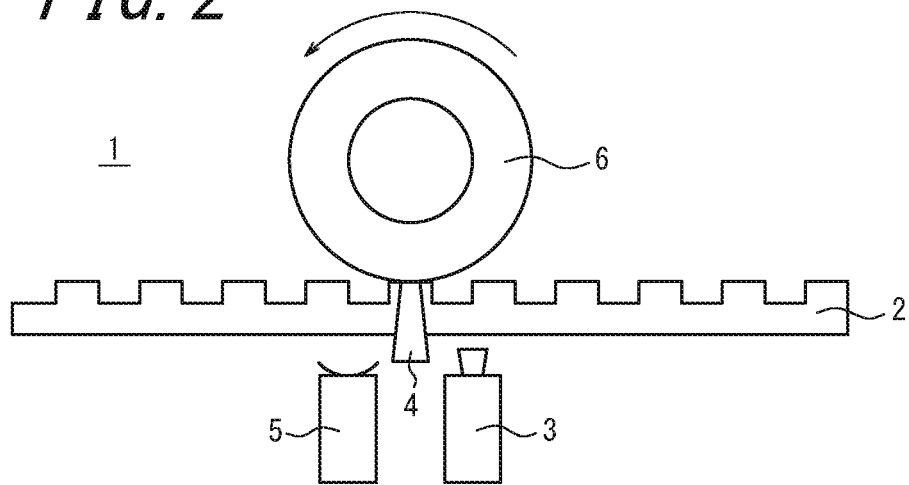
FIG. 2 schematically illustrates an apparatus for evaluating a tire ground contact property used in a method, according to an embodiment of the first aspect and the second aspect of the present disclosure, of evaluating a tire ground contact property on a flat plate having another example of predetermined unevenness.

FIG. 2 schematically illustrates an apparatus for evaluating a tire ground contact property used in a method, according to an embodiment of the first aspect of the present disclosure, of evaluating the ground contact property of a tire on a flat plate having another example of predetermined unevenness. The example illustrated in FIG. 2 differs from the example illustrated in FIG. 1 only in the state of the unevenness on the upper surface of the flat plate 2. The state of the unevenness on the lower surface of the flat plate 2 is similar to FIG. 1. Namely, a large unevenness is formed on the upper surface of the flat plate 2 in the example illustrated in FIG. 2. The upper surface of the flat plate 2 in the example illustrated in FIG. 2 has a square wave cross-sectional shape. The length of the upper side of the square wave is 10 mm, and the length of the lower side is 10 mm. A minute unevenness is formed in this square wave cross-sectional shape. Specifically, the average length RSm of a roughness curve element with a reference length of 0.8 mm is 0.13 mm to 0.4 mm, and the average length RSm of a roughness curve element with a reference length of 0.25 mm is 0.04 mm to 0.13 mm. In the example illustrated in FIG. 2 as well, the wavelength of the terahertz waves is greater than the RSm with a reference length of 0.8 mm or the RSm with a reference length of 0.25 mm. Consequently, the terahertz waves are not scattered by the large unevenness (the square wave cross-sectional shape), since the unevenness is sufficiently large. The terahertz waves are not scattered by the minute unevenness (the unevenness having the RSm of 0.13 mm to 0.4 mm for a reference length of 0.8 mm or the RSm of 0.04 mm to 0.13 mm for a reference length of 0.25 mm) within the large unevenness, either, since the wavelength of the terahertz waves is greater than the aforementioned RSm. The lower surface is similar to the example illustrated in FIG. 1. Accordingly, the same effects as those of the example illustrated in FIG. 1 can be achieved with the example illustrated in FIG. 2. In other words, when a large unevenness for evaluating vibration characteristics, for example, is formed on one of the surfaces of the flat plate 2 (the upper surface in FIG. 2), the terahertz waves are still not scattered by the flat plate 2 if the wavelength of the terahertz waves is larger than the average length RSm of a roughness curve element, from a micro perspective, with a reference length of 0.8 mm.

Figure 3:
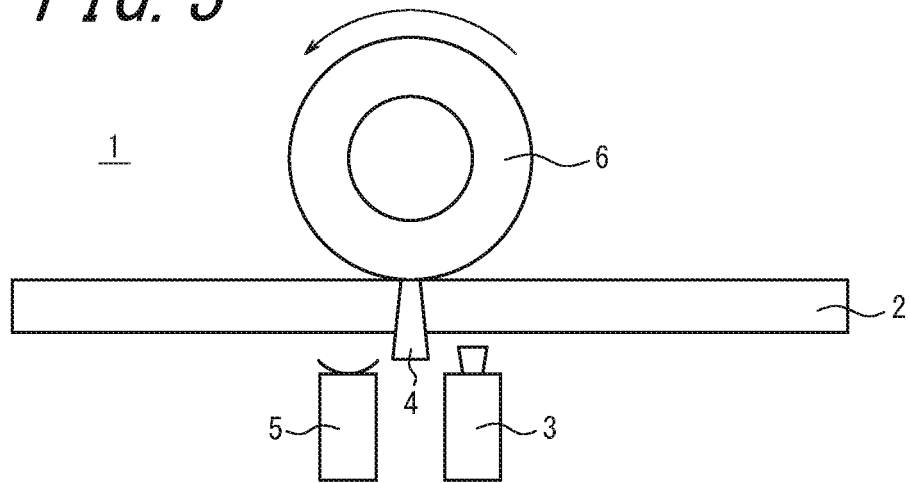
FIG. 3 schematically illustrates an apparatus for evaluating a tire ground contact property used in a method, according to an embodiment of the first aspect and the second aspect of the present disclosure, of evaluating a tire ground contact property on a flat plate having yet another example of predetermined unevenness.

FIG. 3 schematically illustrates an apparatus for evaluating a tire ground contact property used in a method, according to an embodiment of the first aspect of the present disclosure, of evaluating the ground contact property of a tire on a flat plate having yet another example of predetermined unevenness. The example illustrated in FIG. 3 differs from the example illustrated in FIG. 1 only in the state of the unevenness on the upper surface of the flat plate 2. The state of the unevenness on the lower surface of the flat plate 2 is similar to FIG. 1. Namely, in the example illustrated in FIG. 3, the upper surface of the flat plate 2 also has an average length RSm (0.13 mm to 0.4 mm) of a roughness curve element with a reference length of 0.8 mm and an average length RSm (0.04 mm to 0.13 mm) of a roughness curve element with a reference length of 0.25 mm, like the lower surface. In the example illustrated in FIG. 3 as well, the wavelength of the terahertz waves is greater than the RSm with a reference length of 0.8 mm or the RSm with a reference length of 0.25 mm on the upper and lower surfaces. Like the lower surface in FIG. 1, terahertz waves are not scattered by the upper and lower surfaces in this example. The same effects as those of the example illustrated in FIG. 1 can therefore be achieved. Accordingly, the present disclosure can also be used to evaluate the ground contact property of a tire on a flat road surface.

In the example illustrated in FIG. 1, an unevenness modeling an actual road surface is formed only on the upper surface of the flat plate 2. Unevenness of a similar roughness may, however, be formed on only the lower surface of the flat plate 2 instead, or on both the upper and lower surfaces of the flat plate 2. In sum, although actual road surfaces range from paved roads (asphalt, concrete, or the like) to unpaved roads (rock, sand, dirt, or the like), as described above, the effects of the present disclosure can be achieved without scattering of terahertz waves by the flat plate 2 by preparing a variety of flat plates 2 that have a predetermined unevenness modeling these various types of unevenness and selecting various wavelengths of terahertz waves that are greater than the RSm with a reference length of 0.8 mm, or the RSm with a reference length of 0.25 mm, of the predetermined unevenness. It suffices for the terahertz waves not to be scattered by the flat plate 2 along the path from irradiation of the terahertz waves to detection of the reflected waves. Accordingly, the location where the wavelength of the terahertz waves is greater than the RSm need only be at least a portion of the upper surface and at least a portion of the lower surface. On the other hand, the location where the wavelength of the terahertz waves is greater than the RSm can be the entire upper surface and the entire lower surface to facilitate evaluation of the ground contact property when the tire is rolling. When both the irradiation apparatus 3 and the reflected wave detection apparatus 5 are disposed inside the flat plate 2, it suffices for the location where the wavelength of the terahertz waves is greater than the RSm to be at least a portion of one of the surfaces.

<Second Aspect>

FIG. 1 schematically illustrates an apparatus for evaluating a tire ground contact property used in a method, according to an embodiment of a second aspect of the present disclosure, of evaluating the ground contact property of a tire on a flat plate having an example of predetermined unevenness. As illustrated in FIG. 1, this apparatus 1 for evaluating a tire ground contact property includes a flat plate 2, an irradiation apparatus 3 for irradiating terahertz waves, a force sensor 4, and a reflected wave detection apparatus 5.

The irradiation apparatus 3 for irradiating terahertz waves, the force sensor 4, and the reflected wave detection apparatus 5 are the same as in the first embodiment. A description is therefore omitted.

In the present embodiment according to the second aspect, the flat plate 2 is an acrylic plate that is transparent with respect to visible light. In this example, the flat plate 2 has an unevenness modeling an actual road surface formed on one entire surface (the upper surface in FIG. 1). The entire other surface (the lower surface in FIG. 1) of the flat plate 2 is formed to be flat. A minute unevenness is actually formed, however, since unevenness cannot be completely eliminated by engineering. Specifically, on one surface (the upper surface in FIG. 1) in this example, the arithmetic average roughness Ra with a reference length of 8 mm is 10 μm to 80 μm, and the arithmetic average roughness Ra with a reference length of 2.5 mm is 2 µm to 10 µm, as defined in JIS B0601. On the other surface (the lower surface in FIG. 1), the average length Ra of a roughness curve element with a standard length of 0.8 mm is 0.1 µm to 2 µm, as defined in JIS B0601.

In the method of the present embodiment according to the second aspect, the tire 6 is first mounted on one surface (the upper surface in FIG. 1) of the flat plate 2, and a predetermined load is applied to the tire 6, as illustrated in FIG. 1. The tire 6 is assembled onto a rim in this example. The rim, the internal pressure, the predetermined load, and the like are as described in the first aspect.

Next, as in the first aspect, the tire 6 is rotated relative to the flat plate 2 on the flat plate 2. While rotation of the tire 6 is not illustrated, the tire 6 may be rotated using any known apparatus capable of rotating the tire 6 about an axis. When the tire 6 is relatively rotated on the flat plate 2, the tire 6 may be kept in the same position in a manner allowing rotation about an axis, and the flat plate 2 may be moved. Alternatively, the flat plate 2 may be kept motionless, and the tire 6 may be rolled on the motionless flat plate 2. Furthermore, both the flat plate 2 and the tire 6 may be moved for the tire 6 to rotate relatively on the flat plate 2. In either case, the irradiation apparatus 3 and the reflected wave detection apparatus 5 may be kept motionless or moved. In these cases, while not illustrated, any known apparatus capable of moving the flat plate 2, the irradiation apparatus 3, the reflected wave detection apparatus 5, and the tire 6 may be used.

As in the first aspect, the irradiation apparatus 3 is positioned by the other surface (the lower surface in FIG. 1) of the flat plate 2 and irradiates terahertz waves, having a frequency of 0.1 THz to 10 THz, towards the tire 6 located on the one surface (the upper surface in FIG. 1) of the flat plate 2. In this example, the irradiation apparatus 3 is disposed at the lower side of the flat plate 2 (by the other side), but this example is not limiting. The irradiation apparatus 3 may also be disposed inside the flat plate 2, for example, to be capable of irradiating terahertz waves from inside the flat plate 2 towards the one surface (the upper surface in FIG. 1) of the flat plate 2.

In the present embodiment according to the second aspect, the wavelength of the irradiated terahertz waves (0.03 mm to 3 mm for terahertz waves having a frequency of 0.1 THz to 10 THz) is greater than the arithmetic average roughness Ra with a reference length of 8 mm and the arithmetic average roughness Ra with a reference length of 2.5 mm, as defined in JIS B0601, in at least a portion of one surface of the flat plate 2. Consequently, the irradiated terahertz waves are irradiated onto the tire 6 on the flat plate 2 without being scattered by the flat plate 2. Since the wavelength of the terahertz waves is greater than the aforementioned Ra of an uneven lower surface 4b, the terahertz waves reflected by the tire 6 can also travel below the flat plate 2 without being scattered by the flat plate 2.

Next, the terahertz waves reflected by the tire 6 are detected by the reflected wave detection apparatus 5. The ground contact property of the tire 6 is evaluated on the basis of the detection result. For example, the reflected terahertz waves can be converted to an image by the reflected wave detection apparatus 5, and the ground contact property of the tire 6 can be evaluated using the image.

In this way, the method of the present embodiment according to the second aspect can evaluate the tire ground contact property of a tire on the flat plate 2, even when the flat plate 2 has a predetermined unevenness. For example, if the shear stress t in the contact patch is measured with the force sensor 4, then the wear energy can be calculated as follows in the present embodiment. Specifically, a wear rate W of the tread of the tire can be expressed as W=A×E, using a mechanical wear energy E and a constant of proportionality A representing the ease of wear of the rubber. Here, E can be expressed by Equation 1 above.

As explained in the first aspect, $\tau_x$ and $\tau_y$ can be measured with the force sensor 4. The slip amount S can be derived on the basis of the result of detecting the reflected terahertz waves. Accordingly, the wear energy of the tire can be calculated, using the shear stress τ measured by the force sensor 4 and the derived slip amount S, to determine the tread wear rate W of the tire in the present embodiment according to the second aspect.

FIG. 2 schematically illustrates an apparatus for evaluating a tire ground contact property used in a method, according to an embodiment of the second aspect of the present disclosure, of evaluating the ground contact property of a tire on a flat plate having another example of predetermined unevenness. The example illustrated in FIG. 2 differs from the example illustrated in FIG. 1 only in the state of the unevenness on the upper surface of the flat plate 2. The state of the unevenness on the lower surface of the flat plate 2 is similar to FIG. 1. Namely, a large unevenness is formed on the upper surface of the flat plate 2 in the example illustrated in FIG. 2. The upper surface of the flat plate 2 in the example illustrated in FIG. 2 has a square wave cross-sectional shape. The length of the upper side of the square wave is 10 mm, and the length of the lower side is 10 mm. A minute unevenness is formed in this square wave cross-sectional shape. Specifically, the arithmetic average roughness Ra with a reference length of 8 mm is 10 µm to 80 µm, and the arithmetic average roughness Ra with a reference length of 2.5 mm is 2 µm to 10 µm. In the example illustrated in FIG. 2 as well, the wavelength of the terahertz waves is greater than the Ra with a reference length of 8 mm or the Ra with a reference length of 2.5 mm. Consequently, the terahertz waves are not scattered by the large unevenness (the square wave cross-sectional shape), since the unevenness is sufficiently large. The terahertz waves are not scattered by the minute unevenness (the unevenness having the Ra of 10 µm to 80 µm for a reference length of 8 mm or the Ra of 2 µm to 10 µm for a reference length of 2.5 mm) within the large unevenness, either, since the wavelength of the terahertz waves is greater than the aforementioned Ra. The lower surface is similar to the example illustrated in FIG. 1. Accordingly, the same effects as those of the example illustrated in FIG. 1 can be achieved with the example illustrated in FIG. 2. In other words, when a large unevenness for evaluating vibration characteristics, for example, is formed on one of the surfaces of the flat plate 2 (the upper surface in FIG. 2), the terahertz waves are still not scattered by the flat plate 2 if the wavelength of the terahertz waves is larger than the arithmetic average roughness Ra, from a micro perspective, with a reference length of 8 mm.

FIG. 3 schematically illustrates an apparatus for evaluating a tire ground contact property used in a method, according to an embodiment of the second aspect of the present disclosure, of evaluating the ground contact property of a tire on a flat plate having yet another example of predetermined unevenness. The example illustrated in FIG. 3 differs from the example illustrated in FIG. 1 only in the state of the unevenness on the upper surface of the flat plate 2. The state of the unevenness on the lower surface of the flat plate 2 is similar to FIG. 1. Namely, in the example illustrated in FIG. 3, the upper surface of the flat plate 2 also has an arithmetic average roughness Ra (10 µm to 80 µm) with a reference length of 8 mm and an arithmetic average roughness Ra (2 μm to 80 μm) with a reference length of 2.5 mm, like the lower surface. In the example illustrated in FIG. 3 as well, the wavelength of the terahertz waves is greater than the Ra with a reference length of 8 mm or the Ra with a reference length of 2.5 mm on the upper and lower surfaces. Like the lower surface in FIG. 1, terahertz waves are not scattered by the upper and lower surfaces in this example. The same effects as those of the example illustrated in FIG. 1 can therefore be achieved. Accordingly, the present disclosure can also be used to evaluate the ground contact property of a tire on a flat road surface.

In the example illustrated in FIG. 1, an unevenness modeling an actual road surface is formed only on the upper surface of the flat plate 2. Unevenness of a similar roughness may, however, be formed on only the lower surface of the flat plate 2 instead, or on both the upper and lower surfaces of the flat plate 2. In sum, although actual road surfaces range from paved roads (asphalt, concrete, or the like) to unpaved roads (rock, sand, dirt, or the like), as described above, the effects of the present disclosure can be achieved without scattering of terahertz waves by the flat plate 2 by preparing a variety of flat plates 2 that have a predetermined unevenness modeling these various types of unevenness and selecting various wavelengths of terahertz waves that are greater than the Ra with a reference length of 8 mm, or the Ra with a reference length of 2.5 mm, of the predetermined unevenness. It suffices for the terahertz waves not to be scattered by the flat plate 2 along the path from irradiation of the terahertz waves to detection of the reflected waves. Accordingly, the location where the wavelength of the terahertz waves is greater than the Ra need only be at least a portion of the upper surface and at least a portion of the lower surface. On the other hand, the location where the wavelength of the terahertz waves is greater than the Ra can be the entire upper surface and the entire lower surface to facilitate evaluation of the ground contact property when the tire is rolling. When both the irradiation apparatus 3 and the reflected wave detection apparatus 5 are disposed inside the flat plate 2, it suffices for the location where the wavelength of the terahertz waves is greater than the Ra to be at least a portion of one of the surfaces.

Figure 4:
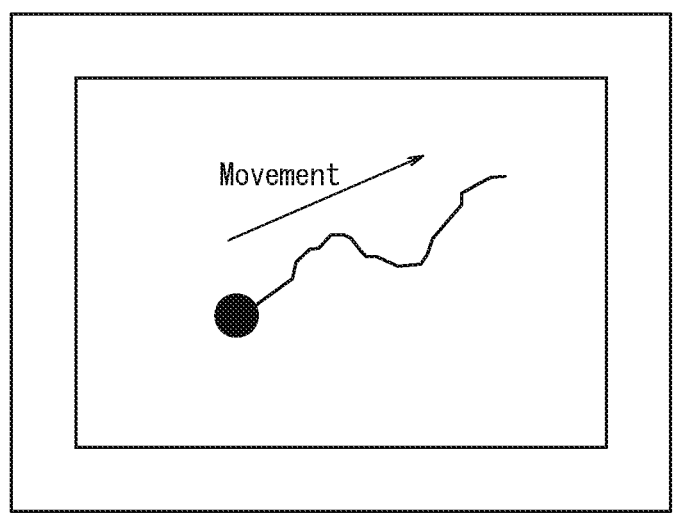
FIG. 4 is an example image illustrating the movement of an identification point, which is a point where a substance is attached.

Here, in the first aspect and the second aspect of the present disclosure, the reflected terahertz waves are preferably detected at the surface. FIG. 4 is an example image illustrating the movement of an identification point (indicated by a black circle in FIG. 4) where a substance is attached. As illustrated in FIG. 4, when the reflected wave is measured at the surface, the movement of the point can easily be measured. When the identification point moves, for example, the reflected terahertz wave can also be detected as a line. The reflected terahertz wave can also be detected as a point by following movement of the identification point.

The first and second aspects of the present disclosure preferably include attaching a substance to a surface of rubber forming the contact patch of the tire, the substance having a larger or smaller absorptance or reflectance of the terahertz waves than the rubber, and detecting a position where the intensity of the detected terahertz waves increases or decreases compared to the surrounding region to detect the position of the substance. Specifically, when the terahertz wave absorptance of the substance is greater than that of rubber, the position of the substance is detected by detecting the position where the intensity of the detected terahertz waves is less than in the surrounding region. When the terahertz wave absorptance of the substance is less than that of rubber, the position of the substance is detected by detecting the position where the intensity of the detected terahertz waves is greater than in the surrounding region. When the terahertz wave reflectance of the substance is greater than that of rubber, the position of the substance is detected by detecting the position where the intensity of the detected terahertz waves is greater than in the surrounding region. When the terahertz wave reflectance of the substance is less than that of rubber, the position of the substance is detected by detecting the position where the intensity of the detected terahertz waves is less than in the surrounding region. A portion of the terahertz waves is not reflected at the tire surface, but rather is reflected after entering inside the tire. Therefore, it is sometimes difficult to distinguish between whether the reflected waves are reflected at the tire surface or inside the tire. In contrast, the above method allows movement of the tread surface to be measured more accurately by easily identifying the position of the substance. A conductor can be used as the substance, for example, since terahertz waves are absorbed by conductors. In greater detail, various materials may be used as the substance, such as a marking or paint including a metal such as titanium oxide or aluminum, an attachable sticker that is metal or includes metal powder, or rubber including a large amount of conductive carbon black or carbon material.

Furthermore, in the first and second aspects of the present disclosure, an image indicating the position where the intensity of the detected terahertz waves increases or decreases compared to the surrounding region is preferably acquired, and a distribution of positions of the substance in the contact patch is preferably derived on the basis of the acquired image. The resolution of the measuring point approximately equals the wavelength. Therefore, the resolution of the measuring point in the present disclosure approximately equals the wavelength of the terahertz waves (for example, the resolution is approximately 0.5 mm when the wavelength of the terahertz waves is 0.5 mm). The movement of the identification point can therefore be measured more accurately by deriving the distribution of points in a range allowed by the resolution and taking the distribution into consideration.

Figure 5:
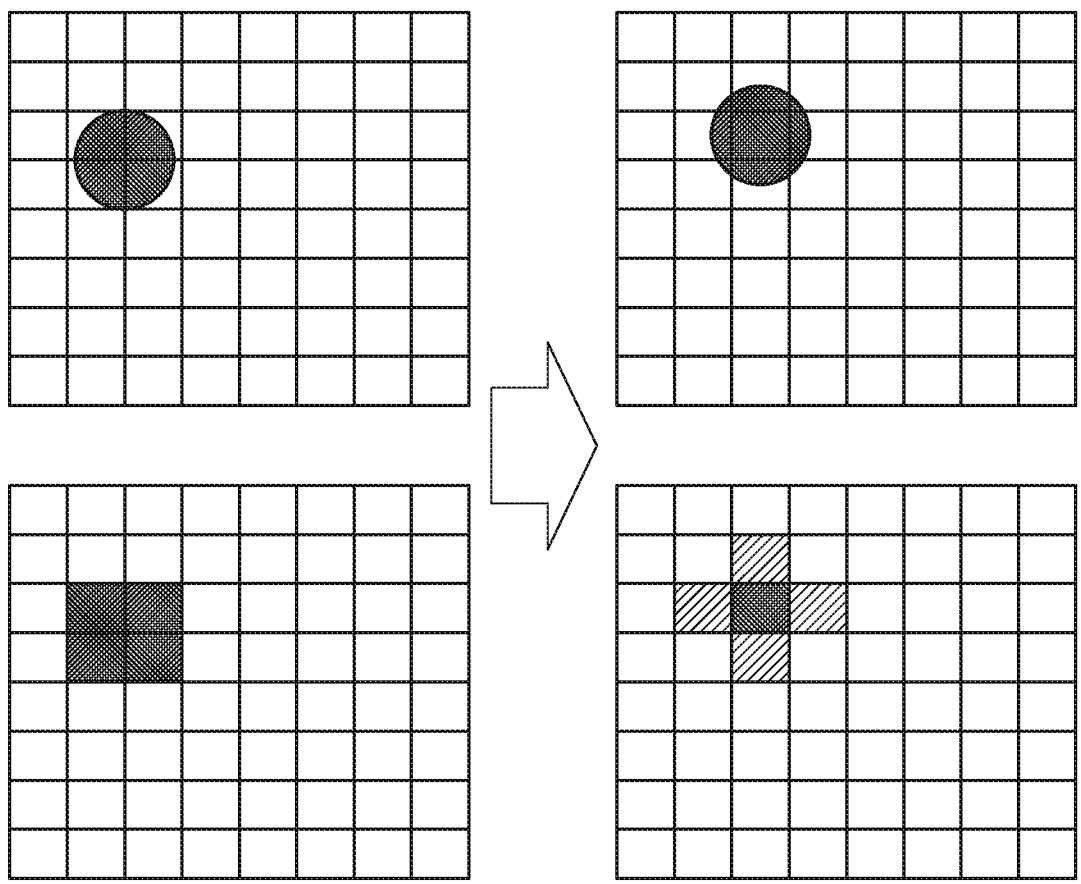
FIG. 5 is an example image illustrating the movement of an identification point, which is a point where a substance is attached, and the distribution of positions of the identification point.

In the first and second aspects of the present disclosure, the distribution of positions preferably includes at least one of a barycentric position, a centroid position, and a distribution range, the barycentric position and the centroid position being calculated from an area weighted by the intensity of the reflected waves from the substance. FIG. 5 is an example image illustrating the movement of an identification point, which is a point where a substance is attached, and the distribution of positions of the identification point. The upper-left and upper-right portions of FIG. 5 are examples in which an identification point having a diameter of 1 mm is arranged on the tread surface, and movement of the identification point (indicated by hatching and cross-hatching) is observed at a spatial resolution of 0.5 mm. Accordingly, the size of one square in FIG. 5 is 0.5 mm×0.5 mm. In the upper-left portion of FIG. 5, the identification point is distributed across four squares. The identification point then moves towards the upper-right of the drawing. In the upper-right portion of FIG. 5, the identification point is distributed across nine squares. In this way, the distribution range of the identification point can first be determined on the basis of the acquired image. All of the squares in which the area occupied by the identification point is greater than 0 can be considered the distribution range of the substance in the acquired image at this time. Alternatively, the substance may be considered not to be present in squares for which the area occupied by the identification point is less than a predetermined value. In the case illustrated in the upper portions of FIG. 5, the barycentric position or the centroid position can be calculated from the area weighted by the intensity of reflected waves from the substance. The square with the largest area, for example, can be considered the barycentric position and the centroid position in the upper-right portion of FIG. 5. The lower portions of FIG. 5 correspond to the upper portions of FIG. 5 after visualization processing to indicate the barycentric position, the centroid position, and the distribution range by shading. In the bottom portions of FIG. 5, entire squares are shaded to a predetermined degree of shading that is determined by the area that the identification point occupies within the square. In this example, the identification point is considered not to be present when the area occupied by the identification point within the square is equal to or less than a certain value. Squares with a large occupied area are displayed as dark squares (by cross-hatching in the drawing), whereas squares with a relatively small area occupied by the identification point compared to the dark squares are displayed as light squares (by hatching in the drawing). In this way, the barycentric position, the centroid position, and the distribution range can be more visually recognizable by the degree of shading in the image, for example. The darkest portion of the image in this case can be more visually recognizable as the square of the barycentric position and the centroid position. Four squares in which a nearly identical area is occupied by the identification point can be shaded to the same degree for greater visibility, as illustrated in the upper-right and lower-right portions of FIG. 5. The barycentric position, the centroid position, and the distribution range can be more visually recognizable in this case as well. In this case, the barycentric position and the centroid position when four squares are considered as one square can be calculated, for example. The movement of the identification point can be measured suitably and accurately by thus calculating at least one of the barycentric position, the centroid position, and the distribution range. At this time, the movement of the identification point can be more visually recognizable as a result of visualization processing to apply shading, as in the lower portions of FIG. 5.

EXAMPLES

Example 1

A sample tire with a tire size of PSR195/65R15 and no tread pattern is prepared. After the tire is mounted on an applicable rim and filled to an internal pressure of 210 kPa, an apparatus such as the one in FIG. 1 is used to measure the slip amount of the tire tread surface when a load of 4.41 kN is applied and the tire is rolled at a speed of 1 km/h and a slip angle of 1° on a transparent acrylic plate. In the present example, the tire is kept in the same position in a manner allowing rotation, and the transparent acrylic plate is moved at a speed of 1 km/h by a movement apparatus.

As Comparative Example 1-1, a transparent acrylic plate with flat (RSm=20 μm for a reference length of 0.08 mm) surfaces (upper and lower surfaces) is used, visible light is irradiated, and the reflected light is measured with a video camera. As Comparative Example 1-2, a transparent acrylic plate (flat lower surface) having an unevenness of RSm=0.2 mm for a reference length of 0.8 mm on the upper surface is used, visible light is irradiated, and measurement is made with a video camera. As Example 1-1, a transparent acrylic plate (flat lower surface) having an unevenness of RSm=0.2 mm for a reference length of 0.8 mm on the upper surface is used, 1 THz waves (wavelength 0.3 mm) are irradiated, and detection is performed at the surface. As Example 1-2, a transparent acrylic plate (flat lower surface) having an unevenness of RSm=0.2 mm for a reference length of 0.8 mm on the upper surface is used, 0.5 THz waves (wavelength 0.6 mm) are irradiated, and detection is performed at the surface. The tire surface is marked in Examples 1-1, 1-2 with a marking pen in which titanium oxide is included. The slip amount is evaluated in Examples 1-1, 1-2 by acquiring images of the marked identification point. Here, since terahertz waves are absorbed by the titanium oxide, the identification point is measured as the region with a lower reflection intensity than the surrounding region. The slip amount is determined to be the barycentric position, calculated from the area weighted by the intensity of reflected waves, in Example 1-1 and to be the centroid position, calculated from the weighted area, in Example 1-2.

TABLE 1

|  | Slip amount at kicking-out time (mm) | |
| --- | --- | --- |
|  | Width direction | Circumferential direction |
| Comparative Example 1-1 | 3.0 | 0.5 |
| Comparative Example 1-2 | unable to measure | unable to measure |
| Example 1-1 | 3.0 | 0.5 |
| Example 1-2 | 2.8 | 0.3 |

As can be seen from Table 1, the slip amount at the kicking-out time of the tire on the transparent acrylic plate having an unevenness of RSm=0.2 mm for a reference length of 0.8 mm on the upper surface can not be measured in Comparative Example 1-2. Conversely, the slip amount at the kicking-out time of the tire on the transparent acrylic plate having an unevenness of RSm=0.2 mm for a reference length of 0.8 mm on the upper surface can be measured in Examples 1-1 and 1-2.

Example 2

A sample tire with a tire size of PSR195/65R15 and no tread pattern is prepared. After the tire is mounted on an applicable rim and filled to an internal pressure of 210 kPa, an apparatus such as the one in FIG. 1 is used to measure the slip amount of the tire tread surface when a load of 4.41 kN is applied and the tire is rolled at a speed of 1 km/h and a slip angle of 1° on a transparent acrylic plate. In the present example, the tire is kept in the same position in a manner allowing rotation, and the transparent acrylic plate is moved at a speed of 1 km/h by a movement apparatus.

As Comparative Example 2-1, a transparent acrylic plate with flat (Ra=1 μm for a reference length of 8 mm) surfaces (upper and lower surfaces) is used, visible light is irradiated, and the reflected light is measured with a video camera. As Comparative Example 2-2, a transparent acrylic plate (flat lower surface) having an unevenness of Ra=40 μm for a reference length of 8 mm on the upper surface is used, visible light is irradiated, and measurement is made with a video camera. As Example 2-1, a transparent acrylic plate (flat lower surface) having an unevenness of Ra=40 μm for a reference length of 8 mm on the upper surface is used, 1 THz waves (wavelength 0.3 mm) are irradiated, and detection is performed at the surface. As Example 2-2, a transparent acrylic plate (flat lower surface) having an unevenness of Ra=40 μm for a reference length of 8 mm on the upper surface is used, 0.5 THz waves (wavelength 0.6 mm)

are irradiated, and detection is performed at the surface. The tire surface is marked in Examples 2-1, 2-2 with a marking pen in which titanium oxide is included. The slip amount is evaluated in Examples 2-1, 2-2 by acquiring images of the marked identification point. Here, since terahertz waves are absorbed by the titanium oxide, the identification point is measured as the region with a lower reflection intensity than the surrounding region. The slip amount is determined to be the barycentric position, calculated from the area weighted by the intensity of reflected waves, in Example 2-1 and to be the centroid position, calculated from the weighted area, in Example 2-2.

TABLE 2

| | Slip amount at kicking-out time (mm) | |
|---|---|---|
| | Width direction | Circumferential direction |
| Comparative Example 2-1 | 3.0 | 0.5 |
| Comparative Example 2-2 | unable to measure | unable to measure |
| Example 2-1 | 3.0 | 0.5 |
| Example 2-2 | 2.8 | 0.3 |

As can be seen from Table 2, the slip amount at the kicking-out time of the tire on the transparent acrylic plate having an unevenness of Ra=20 μm for a reference length of 8 mm on the upper surface can not be measured in Comparative Example 2-2. Conversely, the slip amount at the kicking-out time of the tire on the transparent acrylic plate having an unevenness of Ra=40 μm for a reference length of 8 mm on the upper surface can be measured in Examples 2-1 and 2-2.

REFERENCE SIGNS LIST

1 Apparatus for evaluating a tire ground contact property
2 Flat plate
3 Irradiation apparatus
4 Force sensor
5 Reflected wave detection apparatus
6 Tire

The invention claimed is:

1. A method of evaluating a tire ground contact property, the method comprising:
   mounting a tire on one surface of a flat plate;
   placing a predetermined load on the tire or placing the tire in a no-load state;
   irradiating the tire with a terahertz wave having a frequency of 0.1 THz to 10 THz from another surface side of the flat plate or from inside the flat plate, a wavelength of the terahertz wave being greater than a roughness average length in at least a portion of the one surface of the flat plate and/or greater than a roughness average height in at least a portion of the one surface of the flat plate;
   detecting a reflected terahertz wave from the tire; and
   evaluating a ground contact property of the tire on the basis of a detection result.

2. The method of evaluating a tire ground contact property of claim 1, wherein the wavelength of the terahertz wave is greater than the roughness average length in at least a portion of the one surface of the flat plate.

3. The method of evaluating a tire ground contact property of claim 2, the method comprising:
   mounting a tire on one surface of a flat plate;
   placing a predetermined load on the tire or placing the tire in a no-load state;
   irradiating the tire with a terahertz wave having a frequency of 0.1 THz to 10 THz from another surface side of the flat plate or from inside the flat plate, a wavelength of the terahertz wave being greater, in at least a portion of the one surface of the flat plate, than an average length RSm of a roughness curve element with a reference length of 0.8 mm as defined in JIS B0601 or an average length RSm of a roughness curve element with a reference length of 0.25 mm as defined in JIS B0601;
   detecting a reflected terahertz wave from the tire; and
   evaluating a ground contact property of the tire on the basis of a detection result.

4. The method of evaluating a tire ground contact property of claim 1, wherein the wavelength of the terahertz wave is greater than the roughness average height in at least a portion of the one surface of the flat plate.

5. The method of evaluating a tire ground contact property of claim 4, the method comprising:
   mounting a tire on one surface of a flat plate;
   placing a predetermined load on the tire or placing the tire in a no-load state;
   irradiating the tire with a terahertz wave having a frequency of 0.1 THz to 10 THz from another surface side of the flat plate or from inside the flat plate, a wavelength of the terahertz wave being greater, in at least a portion of the one surface of the flat plate, than an arithmetic average roughness Ra with a reference length of 8 mm as defined in JIS B0601 or an arithmetic average roughness Ra with a reference length of 2.5 mm as defined in JIS B0601;
   detecting a reflected terahertz wave from the tire; and
   evaluating a ground contact property of the tire on the basis of a detection result.

6. The method of evaluating a tire ground contact property of any one of claim 1, wherein the reflected terahertz wave is detected at a surface.

7. The method of evaluating a tire ground contact property of any one of claim 1, the method comprising:
   attaching a substance to a surface of rubber forming a contact patch of the tire, the substance having a larger or smaller absorptance or reflectance of the terahertz wave than the rubber; and
   detecting a position where an intensity of the terahertz wave that is detected increases or decreases compared to a surrounding region to detect a position of the substance.

8. The method of evaluating a tire ground contact property of claim 7, the method comprising:
   acquiring an image indicating the position where the intensity of the terahertz wave that is detected increases or decreases compared to the surrounding region; and
   deriving a distribution of positions of the substance in the contact patch on the basis of the acquired image.

9. The method of evaluating a tire ground contact property of claim 8, wherein the distribution of positions includes at least one of a barycentric position, a centroid position, and a distribution range, the barycentric position and the centroid position being calculated from an area weighted by an intensity of a reflected wave from the substance.

10. The method of evaluating a tire ground contact property of claim 2, wherein the reflected terahertz wave is detected at a surface.

11. The method of evaluating a tire ground contact property of claim 3, wherein the reflected terahertz wave is detected at a surface.

12. The method of evaluating a tire ground contact property of claim 4, wherein the reflected terahertz wave is detected at a surface.

13. The method of evaluating a tire ground contact property of claim 5, wherein the reflected terahertz wave is detected at a surface.

14. The method of evaluating a tire ground contact property of any one of claim 2, the method comprising:
    attaching a substance to a surface of rubber forming a contact patch of the tire, the substance having a larger or smaller absorptance or reflectance of the terahertz wave than the rubber; and
    detecting a position where an intensity of the terahertz wave that is detected increases or decreases compared to a surrounding region to detect a position of the substance.

15. The method of evaluating a tire ground contact property of any one of claim 3, the method comprising:
    attaching a substance to a surface of rubber forming a contact patch of the tire, the substance having a larger or smaller absorptance or reflectance of the terahertz wave than the rubber; and
    detecting a position where an intensity of the terahertz wave that is detected increases or decreases compared to a surrounding region to detect a position of the substance.

16. The method of evaluating a tire ground contact property of any one of claim 4, the method comprising:
    attaching a substance to a surface of rubber forming a contact patch of the tire, the substance having a larger or smaller absorptance or reflectance of the terahertz wave than the rubber; and
    detecting a position where an intensity of the terahertz wave that is detected increases or decreases compared to a surrounding region to detect a position of the substance.

17. The method of evaluating a tire ground contact property of any one of claim 5, the method comprising:
    attaching a substance to a surface of rubber forming a contact patch of the tire, the substance having a larger or smaller absorptance or reflectance of the terahertz wave than the rubber; and
    detecting a position where an intensity of the terahertz wave that is detected increases or decreases compared to a surrounding region to detect a position of the substance.

18. The method of evaluating a tire ground contact property of any one of claim 6, the method comprising:
    attaching a substance to a surface of rubber forming a contact patch of the tire, the substance having a larger or smaller absorptance or reflectance of the terahertz wave than the rubber; and
    detecting a position where an intensity of the terahertz wave that is detected increases or decreases compared to a surrounding region to detect a position of the substance.

19. The method of evaluating a tire ground contact property of claim 2, the method comprising:
    attaching a substance to a surface of rubber forming a contact patch of the tire, the substance having a larger or smaller absorptance or reflectance of the terahertz wave than the rubber; and
    detecting a position where an intensity of the terahertz wave that is detected increases or decreases compared to a surrounding region to detect a position of the substance; and
    wherein the reflected terahertz wave is detected at a surface.

20. The method of evaluating a tire ground contact property of claim 3, the method comprising:
    attaching a substance to a surface of rubber forming a contact patch of the tire, the substance having a larger or smaller absorptance or reflectance of the terahertz wave than the rubber; and
    detecting a position where an intensity of the terahertz wave that is detected increases or decreases compared to a surrounding region to detect a position of the substance; and
    wherein the reflected terahertz wave is detected at a surface.

* * * * *